US008827794B2

(12) United States Patent
Skatter

(10) Patent No.: US 8,827,794 B2
(45) Date of Patent: Sep. 9, 2014

(54) SYSTEM AND METHOD FOR SELECTING WINNING TICKETS IN A LOTTERY GAME

(71) Applicant: Sondre Skatter, Oakland, CA (US)

(72) Inventor: Sondre Skatter, Oakland, CA (US)

( * ) Notice: Subject to any disclaimer, the term of this patent is extended or adjusted under 35 U.S.C. 154(b) by 88 days.

(21) Appl. No.: 13/763,713

(22) Filed: Feb. 10, 2013

(65) Prior Publication Data

US 2014/0228087 A1 Aug. 14, 2014

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |

(52) U.S. Cl.

USPC .............................................. 463/17; 463/42

(58) Field of Classification Search

USPC ...................................................... 463/17, 42

See application file for complete search history.

(56) References Cited

U.S. PATENT DOCUMENTS

2010/0105462 A1 * 4/2010 Walker et al. .................. 463/17

* cited by examiner

*Primary Examiner* — William M. Brewster

(57) ABSTRACT

Use of the present invention provides a method and system for selecting the winning tickets in a lottery game. The method adds to traditional lottery games a social network element, which will influence the winning ticket selection process. The top prize level is still determined by a traditional random draw, but lower-level prizes are determined based on a ticket-holder's proximity in the social network to players that won the higher-level prizes. In a simple form the $2^{nd}$ level prizes will go to players that have direct connections in the social network (friends) to a $1^{st}$ prize winner. Players can manage their social network independently from purchasing the tickets. Traditional sales outlets may be used for ticket sale. Pre-existing social networks may be utilized in the dedicated social network for the game.

25 Claims, 6 Drawing Sheets

SYSTEM AND METHOD FOR SELECTING WINNING TICKETS IN A LOTTERY GAME

This non-provisional patent application claims priority based upon provisional application No. 61/599,159 filed Feb. 15, 2012

BRIEF DESCRIPTION

In regular lottery games the winning tickets are generated in a random drawing process. In this invention, the process of generating the winning tickets involves processing a social network. The first prize is still selected in a random drawing, but the second and third prizes, which have smaller payouts, will be determined as a function of the relative position of the players to the top-prize winner in a social graph, or network. The players who are immediate neighbors in the social graph—also called friends—will share the allocated pot for the second prize payouts. The friends' friends, or the players that are separated from the 1st prize winners by two degrees in the social network, will share the prize money allocated for the third prize.

BACKGROUND OF THE INVENTION

Lottery games, or Lotto as it is sometimes called, have gained great popularity in both the United States and abroad. Today, legal lotto games are conducted in most US states and Canadian provinces as well as internationally in many countries. Lotto is a major source of revenues for the states and provinces which sponsor lotteries.

Lotto is a gambling game in which the player must correctly pick a pre-set quantity of numbers to be drawn from a larger pool of numbers. In a typical lotto game, a player fills out a computer coded card(s) with selected number combinations. The card(s) are then presented to an authorized lottery dealer. The dealer issues lotto tickets containing the one or more selected sets that have been generated by a computerized ticket generator and purchased by the player.

Current jackpot games typically include matching six or seven numbers selected from a set of 40 or 50 or more against numbers drawn in a weekly or biweekly drawing. Other Lotto games, for example the so called PICK 3 or PICK 4 games, involve a selection of three and four numbers respectively from a group of (usually) 10 numbers, and matching the selected numbers against daily drawings held by the lottery sponsor.

In another lottery game, raffle, each sold ticket is unique, and the winning tickets are selected in a random draw. This game lends itself to smaller settings, but is also used in national lotteries such as the annual Spanish raffle.

At the time of the jackpot drawing, which is televised in many jurisdictions, the numbers (usually printed on balls) are withdrawn from the total number pool using number selection devices such as air flotation or drum roll. The balls are drawn without replacement, that is, after a particular number is drawn it is not returned to the pool and cannot be redrawn. A preset number of balls forms a winning number combination. If the numbers selected by the player on a particular ticket correspond to the winning number combination, the player wins a cash prize. Currently existing lotto games pay cash awards in instances where a player picks all of the drawn numbers corresponding to a winning number combination, as well as those instances in which a player has picked less than all of the numbers, for example when the player has correctly picked four out of six or five out of six numbers of the winning number combination. Or, in the case of raffle, when one of a player's unique tickets matches one of the drawn tickets.

Lotto tickets are typically purchased in two ways. Initially, players can code up a computer readable card with their number selections. Alternatively, lottery tickets are purchased by players who permit random ticket generators to generate their tickets. Raffle could be put in the second category. The selected number combinations are then transmitted to a central computerized system which stores the selected number combinations, whether coded up by a player or randomly selected by machine. Each of the transmitted number combinations corresponds to a purchased ticket. Alternatively, the wage is placed via a web server on the internet. At the time of the drawing, the central governing authority, which is typically a state contractor, can thereby quickly determine whether one or more jackpot prizes has been awarded, and can further determine the number and distribution of sub jackpot prizes.

Since the winning numbers are picked in a random process the game of lotto is entirely a game of luck. These games are facing competition from other games that involve wagering, such as online poker and live casinos. But they are also facing competition in engaging individuals from activities that don't involve wagering. In particular, internet-based social networks such as Facebook are drawing millions of people into spending several hours per day engaged. Thus it would be desirable for the lotto industry—and the sponsors—to incorporate social network elements into the lotto games themselves.

Adding a social network component to the game of lotto could attract interest to the game and improve the revenues for the sponsors. The game could utilize a pre-existing social network for the purpose of the game or it could build its own social network. Separate social networks can be built easily by leveraging existing social networks and their Application Protocol Interface (APIs) so a player can reach out and solicit their connections to participate in the lotto game.

In order to comply with the laws governing lotteries in the US the new game could still operate very much like existing lotto games such as the ones described above. Tickets could still be purchased at the existing online stores that serve as sales terminals. There would also be a random draw to generate at least a subset of the winning tickets. There will then be an added component where the players are linked together in a social network. Some of the prizes will be based on a players proximity in the social network to one of the winners of the random draw prizes.

Such a game platform would be ideal to recruit new players to the game. It would also create a game where friends will benefit from one another in terms of winning. Whenever someone wins the 1$^{st}$ prize, which is based on a random draw, all his or hers connections in the lotto social network participating in the current game will also win. This will create very compelling "big-win" stories, where little communities, not necessarily geographically based, suddenly have many winners.

The present invention could even be implemented on top of an existing lotto game, where additional prizes are issued based on social network.

SUMMARY OF THE INVENTION

Use of the present invention provides a method and system for generating the winning numbers in a lottery game, and thus presents a supplement to the pure random draw process to determine the winning numbers in a lotto game. The method still uses random draw for some of the winning tickets, typically the first prize ticket(s). Then lower prizes are determined based on a ticket holder's proximity within a social network to a person holding a winning ticket.

Even though it is easy to imagine the current invention operating solely on the Internet where players can make all the game transactions from within a web site or application, including mobile clients, the game as it is described here is adapted to the regulatory constraints that govern lotto in the USA. As such the game that is described here still operates upon the existing lottery infrastructure with an added social network component that runs on a separate platform. Without any loss of generality for the present invention, this is the operational context that will be described herein.

The lotto tickets are still purchased from existing sales outlet, which are online sales terminals. In addition there is a separate platform where a user can log in to register the purchased ticket(s), and manage his or her social network. The social network that is created by the players of the lotto game then plays a role in selecting a subset of the winning tickets. When the first prize winner tickets are selected in a random draw, the lotto system will check to see if this ticket has been registered by any of the users in the social network. If not, this is still a winning ticket, but there will be no lower-order prizes based on the social network proximity to the holder of this winning ticket. If, on the other hand, the winning ticket is registered by a user in the social network, then subsequent lower-level winning tickets will be identified based on the social network in the proximity of the ticket holder. Stated more simply, if player A registered the ticket that won the first prize in the random draw, then player B, who also registered a ticket and is directly connected to player A in the social network, wins a second prize. In fact, if player B bought two tickets both the tickets will win the 2$^{nd}$ prize. As usual for pari-mutuel games, the prize payout for 2$^{nd}$ prize level is split equally between all the winning tickets at that level. If 10% of the pot was allocated to the 2$^{nd}$ prize, and player A in the example above only had one direct connection, player B, then player B wins the 10% of the pot whether he has one ticket or two. In the second case, the winnings per ticket is half that in the first case. However, if there are more 2$^{nd}$ prize winners, then player B will take a larger portion of the pot by having two tickets rather than one.

Along the same lines, the 3$^{rd}$ prize winners are the players that were connected to the winners by two links in the social network. Or said differently, they were directly connected to one of the 2$^{nd}$ prize winners.

The system of the present invention is comprised of a plurality of remote locations, a network, and a central processor. Each of the plurality of remote locations is capable of communicating with the central processor via the network. Players purchase their tickets at any of the plurality of remote locations. They will also submit additional information such as registering ticket with a user ID and managing a social network to the central processor via the network. After the closing time for the current lottery game occurs, the first prize tickets are selected in a random draw. In conjunction with the draw, the central processor analyzes the winning tickets, identifying whether they are owned by someone in the social network and then identifies secondary winning tickets by processing the social network. The random draw can be a computerized process or be based on a traditional draw of balls from a basket. Once all the winning tickets have been identified, the result is communicated to the plurality of remote locations via the network and is also stored to memory to form a historical record that may be used by players in future games.

In one embodiment the plurality of remote locations are authorized lotto game agents such as convenience stores, the network is the Internet and the central processor is a computer located at the lotto game provider's site. In this same embodiment the lotto tickets are based on a numbering scheme where each ticket has a unique number or other identifier. In addition, the ticket also has a validation code, which has to be entered when registering the ticket to a user in the social network game interface.

In the summary description of the preferred embodiment below the game will be referred to as Social Lotto. Although this particular game is a raffle game, it will be clear that the present invention can be applied to any lotto game by making a lower level prize be dependent on a ticket holders proximity in a social network to a winner of a higher level prize. This higher prize level can be for example the 1$^{st}$ prize, or 3$^{rd}$ prize, in the multi-state PowerBall™ lottery game.

Tickets can be purchased either in an online terminal sales outlet or through a remote terminal. Each ticket has a unique number. The drawing process is selecting at random one of the numbers corresponding to the tickets sold in current game.

The player can enter into a web-site, or application (mobile or web), to register the ticket to his user account. The user accounts are created specifically for this game. Users can invite friends (or other connections) to participate in Social Lotto through third party channels such as Facebook. The application will tap into Facebook's existing social network to contact friends. Friends will be invited to participate in Social Lotto. When doing so, they will be added as friends. Social Lotto will build up its own social network on its server (or use a service from an existing social network provider if preferred). Social Lotto users will manage its social network much like this is done on Facebook or LinkedIn. This includes discovering and adding friends, un-friending, and introducing friends to one another.

When a user register a purchased lotto ticket to his user account (if bought in an online sales terminal this is a separate step, if bought from an remote terminal (web app or similar) the linkage between user account and ticket may be done at the time of purchase), this ticket is associated with the user in the Social Lotto database.

In order to prevent fraudulent registering of tickets, a validation code, printed on the ticket, can be entered. This will ensure that only tickets genuinely in the procession of the user will be registered to the players account. Each ticket thus has a validation code, and only the lotto company knows the correct combinations of ticket number and validation numbers. Thus, a player cannot simply guess a number to get the ticket registered to his name. Even if this kind of fraud wouldn't enable the player to claim the first prize (since he would have to have the physical ticket), it could cause this person's friends to wrongfully obtain the 2nd prize.

Moreover, a given ticket should only be allowed by the Social Lotto system to be registered once. Thus this would prevent a second type of fraud.

In a given draw only the first prize is selected in the random drawing process. If this ticket is not registered to a user account (registration process described in preceding paragraph), and this user is connected to another user with registered tickets, another winning number is drawn. The two winning numbers will thus share the top prize. If the second winning ticket too doesn't satisfy the conditions stated above, the drawing will continue. This process will be repeated until a winning ticket with an associated registered user, who also have connections in the social network with registered tickets, has been drawn. The prize is split equally between the winners. However, when determining the winners of the 2nd and lower prizes, only the last 1st prize ticket is relevant.

The second prize goes to all the participating friends of the $1^{st}$ prize winners, i.e. users with registered tickets that are directly connected in the social network to the user with a registered $1^{st}$ prize ticket. The lotto operator will identify these winners by searching the Social Lotto social network for direct connections to the user account that was registered with the 1st prize winning ticket. For each identified 2nd prize winner, all the tickets that this user registered are deemed 2nd prize winning tickets. The Social Lotto system will notify each 2nd prize winner by email or other communication path defined within the Social Lotto application. This way the winner will know that all his tickets won the 2nd prize. The lotto company will also need to publish all the winning numbers to the online terminal so that the prize money can be disbursed.

For third and fourth prizes the same process can be used. Third prize goes to all friends of the $2^{nd}$ prize winner with registered tickets. These third prize winners are also second-degree connections of the registered 1st prize ticket holder. The fourth prize (if any) goes to all the direct connections of the $3^{rd}$ prize ticket holders that have registered tickets. These fourth prize winners are also third-degree connections of the $1^{st}$ prize winner.

For the 3rd and higher prize level winner identification an additional constraint should be employed: Each winning linkage, the linking between the 1st prize winner and the winner of a lower prize, can only use an individual link in one direction. For example, if a given link was used to link a second prize winner to the 1st prize winner it cannot be used to link back to the 1st prize winner as the winner of a third prize.

If there are no 3rd prize winners identified, the prize allocation for the 3rd (and higher) prizes could go to a jackpot. Another possibility is to keep drawing 1st prize tickets until one appears with a user that has second-degree connections.

Because the unique algorithm uses the structure of a social network to determine s as subset of the winning tickets the present inventions differs from other lotto game methods. And because the method of the present invention inherently incentivizes recruiting of new users by existing users it offers a tool for lotto operators to increase the player base and revenue without departing from the regulatory limits for lotto games.

Amongst the various ways that social networks might be applied to a lottery game, the present invention using a combination of traditional random draws and social network structure to be viable. The random generation of the winning ticket is key to ensure that the game cannot be influenced unduly by strategy in the realm of the social network. In the current structure a player can increase his chances to win $2^{nd}$ prize by having many friends who play, and thus more chances of being connected to someone who wins the $1^{st}$ prize. However, the benefits are mutual, and the average payout per $2^{nd}$ prize ticket will be much smaller when there the $1^{st}$ prize is awarded in a highly connected area of the social network. As in other social networks, establishing connections must be mutually agreed upon by both parties, which limits any strategy to over-connect.

The game has the potential to create engagement and excitement due to the awareness of the social network that it brings with it. At each draw, for example, a user could see how many connections away he was from a winning ticket. This will resemble the well known 'Kevin Bacon effect'.

Game companies can also insert elements of the present invention into an existing lottery game by allocating a given amount of the pot to social network prize. This has the advantage of a pre-existing player base, and would enable a rapid establishment of a large social network.

It is an object of the present invention to partially substitute the random winning ticket selection process of any lotto type game with a novel winning ticket selection process as described above. It is a further object of the present invention to directly utilize social networks in the lottery game. It is still a further object of the present invention to provide a novel lotto type game which can be easily implemented with existing on-line lotto systems. These and other objects and advantages of the present invention will become apparent from the detailed description which follows in conjunction with the drawings.

DETAILED DESCRIPTION OF PREFERRED EMBODIMENTS

As described briefly above, the method and system of the present invention provide a unique and novel way for a lotto operator to generate the winning tickets. As will be discussed below, the method of the present invention further provides an increased level of interest among the players by introducing a social network as a core component of the game.

Figure 1:
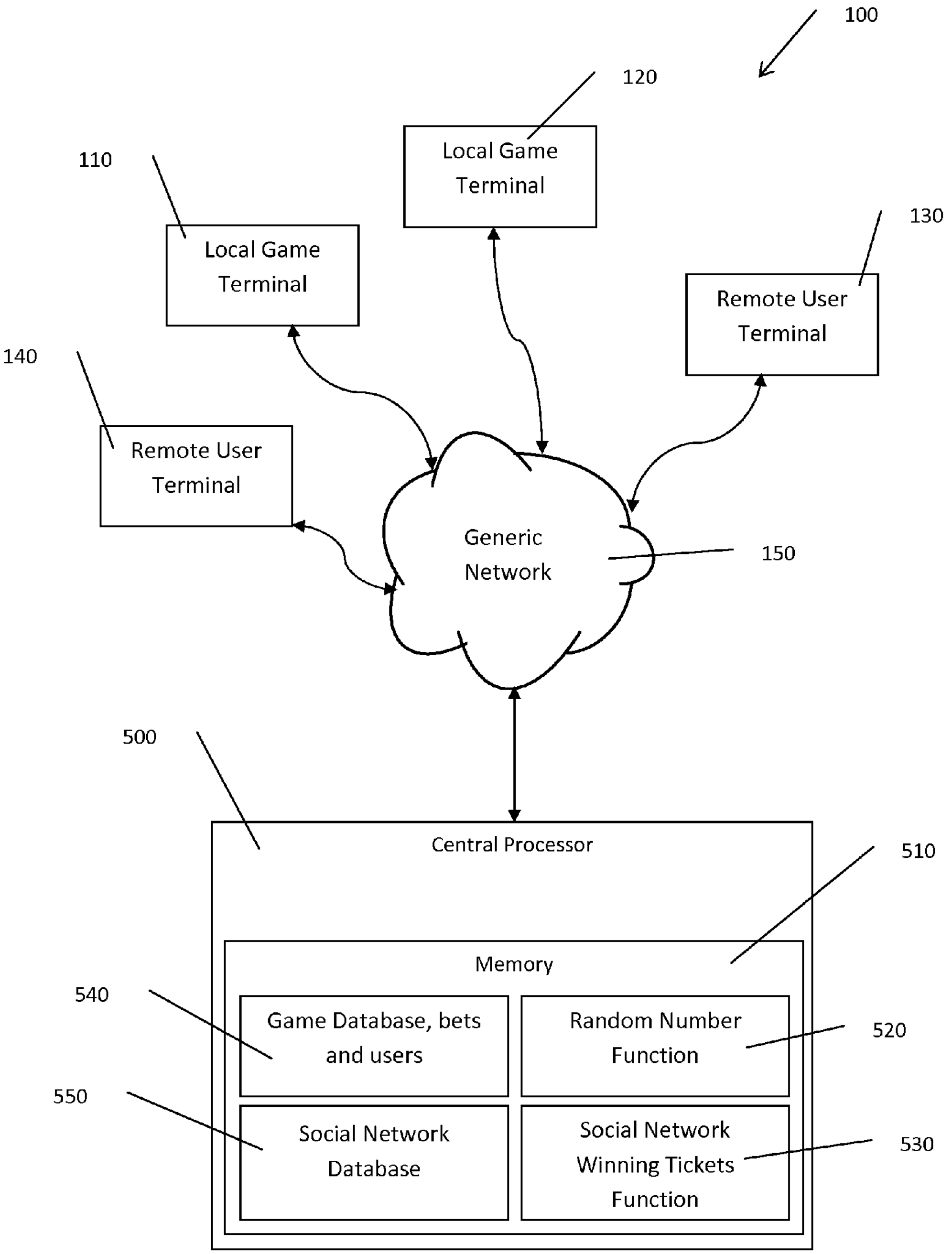
FIG. 1: is a high level diagram of a system that can implement the method of the present invention

FIG. 1 shows a high level system 100 capable of implementing the method of the present invention. Local Game Terminals 110 and 120 in one preferred embodiment of the present invention are remote authorized lotto agents, for example, convenience stores. It will be recognized, however, that these remote locations could be any site that has the ability to communicate with the Generic Network 150. Players who wish to participate in the current game may do so at any of these remote locations.

Also in this preferred embodiment, the Generic Network 150 is the Internet. It will be understood that any network capable of communicating between the remote locations such as Local Game Terminals 110 and 120 and the Central Processor 500 could be used without departing from the spirit of the invention, thus the use of the Internet should not be read as a limitation on the scope of the invention. By way of example, but not meant as a limitation, the Generic Network 150 could be the Public Switched Telephone Network [PSTN]. Alternatively, the network could be wireless, such as a satellite network or a microwave network.

Also shown in FIG. 1 are Remote User Terminals 130 and 140, which allows the users to connect to the game databases to register tickets and to manage their social network. These remote user terminals can be a desktop computer or a mobile phone interacting with the central database via an Internet browser or a dedicated software application.

The Central Processor 500 in this preferred embodiment is a computer containing, among other things, a Memory 510 with at least a Social Network Winning Tickets Function 530 (SNWTF). The Central Processor 500 in this preferred embodiment also contains a Random Number Function 520, which allows the first prize winning tickets to be selected at random from the pool of all purchased tickets in the current game cycle. The Central Processor 500 also contains a Game Database 540, which contains all the user information, which is all the information associated with a user account, as well as all the tickets that a user has registered to his or her account in the current game cycle. The Central Process furthermore contains a Social Network Database 550, which stores all the connections between the users and thus constitutes the social network used for the present invention.

It will be recognized that the Central Processor 500 is comprised of a number of other hardware and software components, but since these do not relate directly to the method of the present invention they are not shown or discussed for clarity. It will be further recognized that any central processing machine with the capability of storing instructions and operating upon data could be used without departing from the spirit of the invention, thus no limitation on the scope of the invention is implied.

Also in this preferred embodiment, the Generic Network 150 is the Internet. It will be understood that any network capable of communicating between the remote locations such as Local Game Terminals 110, 120, Remote User Terminals 130 and 140, and the Central Processor 500 could be used without departing from the spirit of the invention, thus the use of the Internet should not be read as a limitation on the scope of the invention. By way of example, but not meant as a limitation, the Generic Network 150 could be the Public Switched Telephone Network [PSTN]. Alternatively, the network could be wireless, such as a satellite network or a microwave network.

Before a detailed discussion of the method of the present invention is presented, a short discussion of a typical game cycle would be instructive. At the start of a game cycle a population of players select purchase their tickets, for example six numbers selected from a group of fifty numbers, and submit their entries to a central control point by some method. This method can be one of many, but common to all games is that at some point in time no further entries are accepted and the game is closed. Once closed, all entries are recorded by one of several means and a winning number combination is determined and published. As discussed above, the selection method can be one of many, but is always random. Once the winning number combination is published, the winning players may claim their prizes by presenting proof that they did indeed have the winning number combination. Thus the five main steps in the game process are number selection, entry submission, winning number generation, publication and prize collection.

The method of the present invention operates along the same general lines. The fundamental difference between the method of the present invention and contemporary lotto gaming methods are twofold: First, there is an additional phase where a user can register a ticket and manage a social network, which is part of the game. Second, the determination of the winning numbers is now also a function not only of a random process but also the social network, which is a component of the game.

Figure 2:
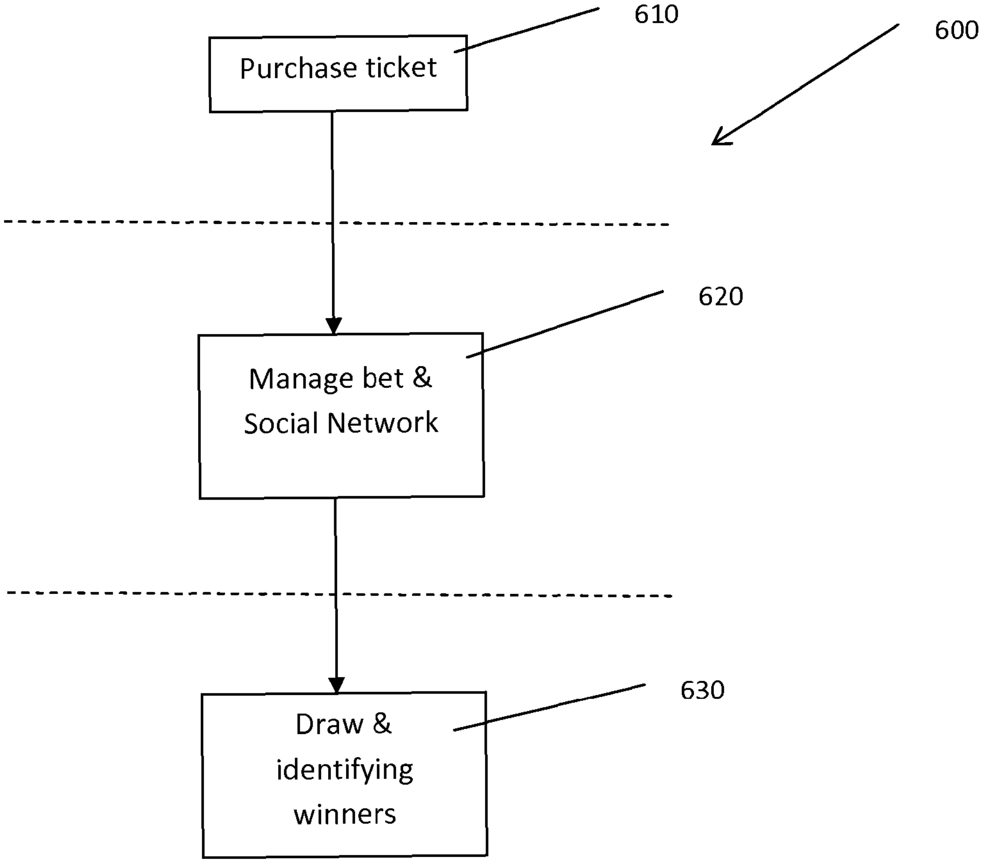
FIG. 2: is a high level diagram of the main game cycle for the present invention.

FIG. 2 shows the main game cycle 600 for this game. The first phase 610 of the game is comprised by the user buying a ticket. This can be done by purchasing a ticket in an online store, or from a terminal hosted by a remote computer. In the second game cycle phase 620, which is optional to the user, the user registers the ticket using a user account. In this phase the user can also manage a social network associated with his or her user account. In the third phase 630 of the game cycle the winning tickets will be identified. This includes notifying the winners directly as well as publishing the winning tickets (not the users) to the online sales terminals.

Figure 3:
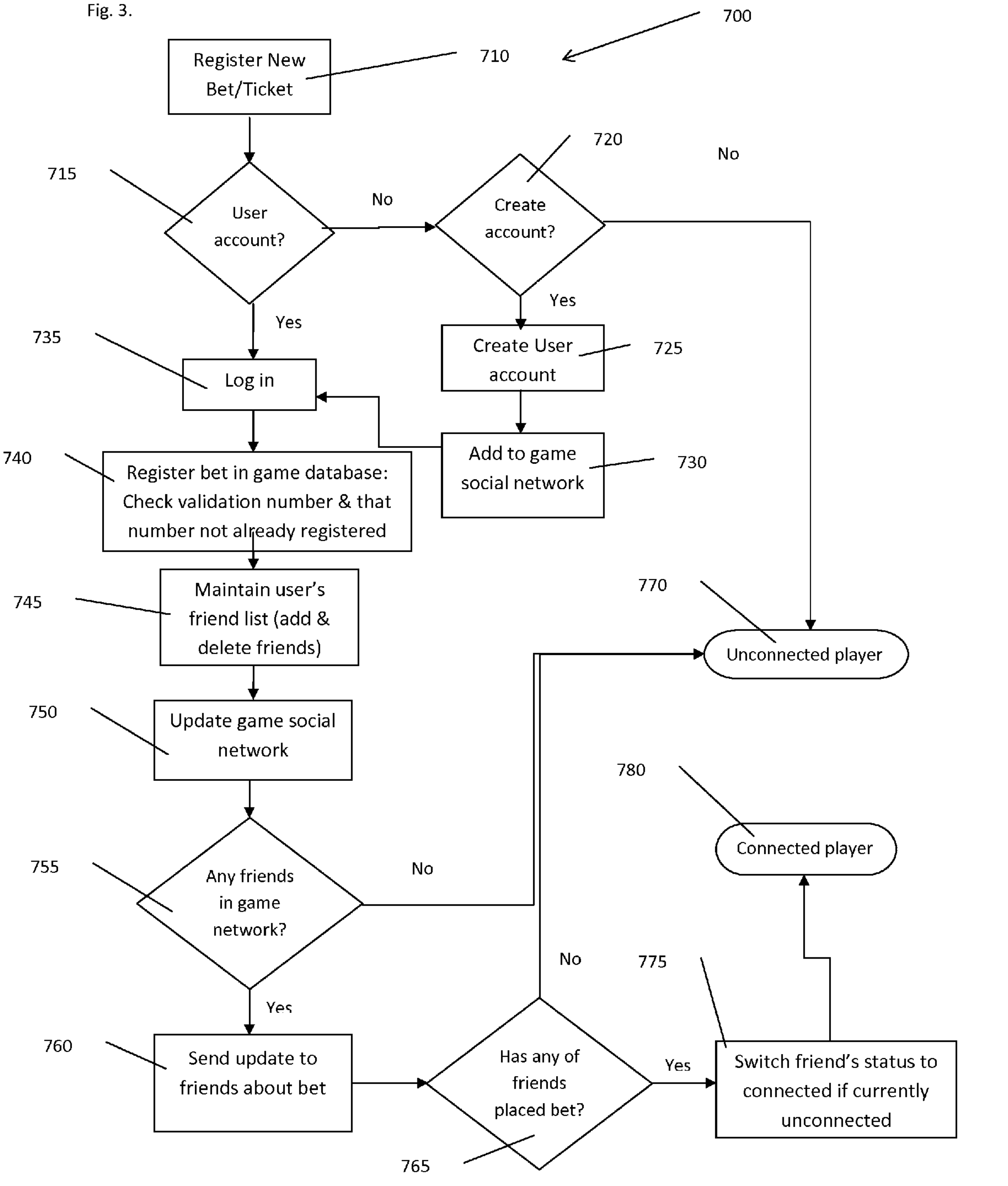
FIG. 3: is a graphical representation of the method of the present invention particularly describing the phase where a user registers a ticket and manages the social network.

FIG. 3 shows in a flow chart 700 the details of the second phase 620 of the game from FIG. 2. In this phase, which happens asynchronously to the purchasing of the ticket, the user can interact with the game database 540 and the Social Network database 550 via a remote user terminal 140. In the preferred embodiment this remote user terminal is a computer or mobile phone accessing the database via an internet browser or a dedicated software application.

The most basic action 710 for a user is to register a purchased ticket to associate it with his user account. Before the ticket can be registered the user needs to be identified 715 with a user account. If the user does not yet have a user account he will routed to an interface to create an account 720. After the account has been created 730 the user will also be added to the pool of users in the social network. However, at this point the user is not yet connected to any other users in the social network. Now the user, whether he already had an account or just created one, can log in 735.

The next step is to register the new ticket 740 to the Game Database. This process also requires the user to enter a validation number. The central computer will validate that this ticket hasn't already been added to the database and that the validation number matches that which is stored for this ticket number in the database. This validation step is needed to prevent users from entering ticket numbers other than the one they purchased. This could happen either because a user saw a number on someone else's ticket or by just guessing a ticket number. The description in this paragraph naturally describes the ticket number for a raffle lottery game. In the case of a lotto game where a user select a set of numbers from a list of available numbers, this ticket can still be identified by using the serial number of the ticket. In this case this serial number along with the validation number is what is registered to the user in the database.

A user now can also maintain his list of friends 745 by either 1) removing existing connections ("unfriending"), 2) invite people outside of the current network to become members and play the lottery game, 3) discover and solicit other members in the social network to become friends, or 4) accepting a friend request from another user. This process mirrors what happens on existing social networks such as Facebook and LinkedIn.

Any change that the user performs in step 745 is now also updated by the central computer in the representation of the social network for the current game. Note that this is a subset of the general social network representation in the Social Network database 750 since not all members may be playing in the current game cycle.

The central computer will check 755 whether the user that just registered a ticket has any connections in the social network. If not, the user and his ticket will be assigned the status of an 'Unconnected player' 770. This status is important during the winning ticket selection process described below. If on the other hand the user has connections in the social network, an update message will be sent 760 to all connections of this user. This message will inform these users that their connection has purchased a ticket, and will encourage them to participate in the current game as well. In case their friend would win $1^{st}$ or $2^{nd}$ prize they would only qualify for the next-level prize if they have purchased a ticket in the current game.

Next the central computer will check 765 whether any of their connections have registered tickets in the current game. If not, this user will still be assigned the status of an 'Unconnected player' 770. If on the other hand, one or more of his connections have registered tickets in the current game cycle, then the player will be assigned the status 'Connected player' 780. At the same time the central processor will check the status of all the connections (friends) of the current player. If any of them have the status 'Unconnected player' they will now be assigned the status 'Connected player'.

Note that a user can also perform step 745 without registering a ticket. For example, the user may come back to the site (or application) at a later time, but within the same game cycle, and accept a friend request from another player. Any time step 745 has been performed the follow-on steps described above is repeated.

In the same manner, it is also possible to create a new user account or log in without registering a new ticket. Similarly the user can register more than one ticket, in which case step 740 will be repeated for each ticket.

Figure 4A:
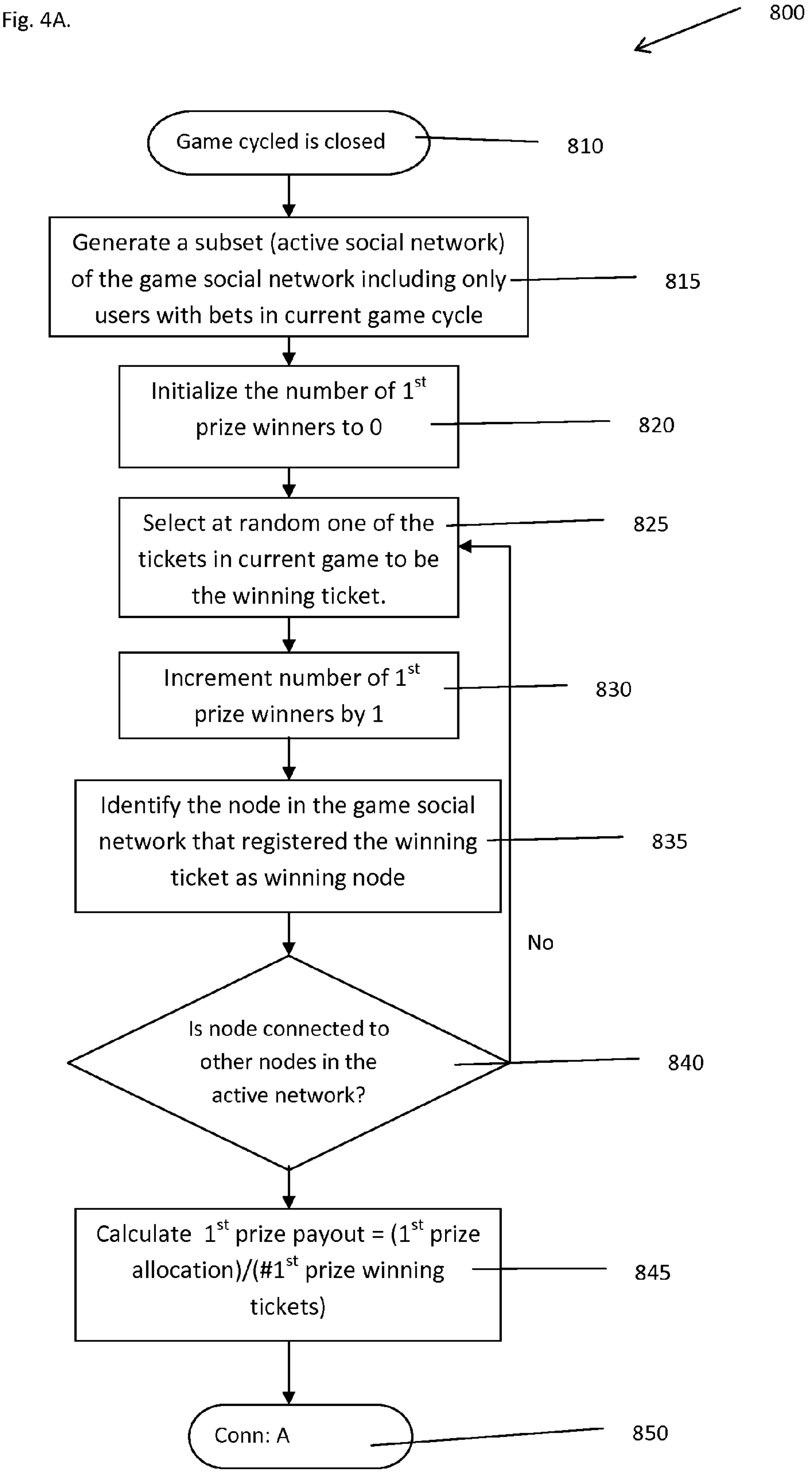
FIG. 4A: is the first part of a graphical representation of the method of the present invention to select all the winning tickets and identify the winners.
Figure 4B:
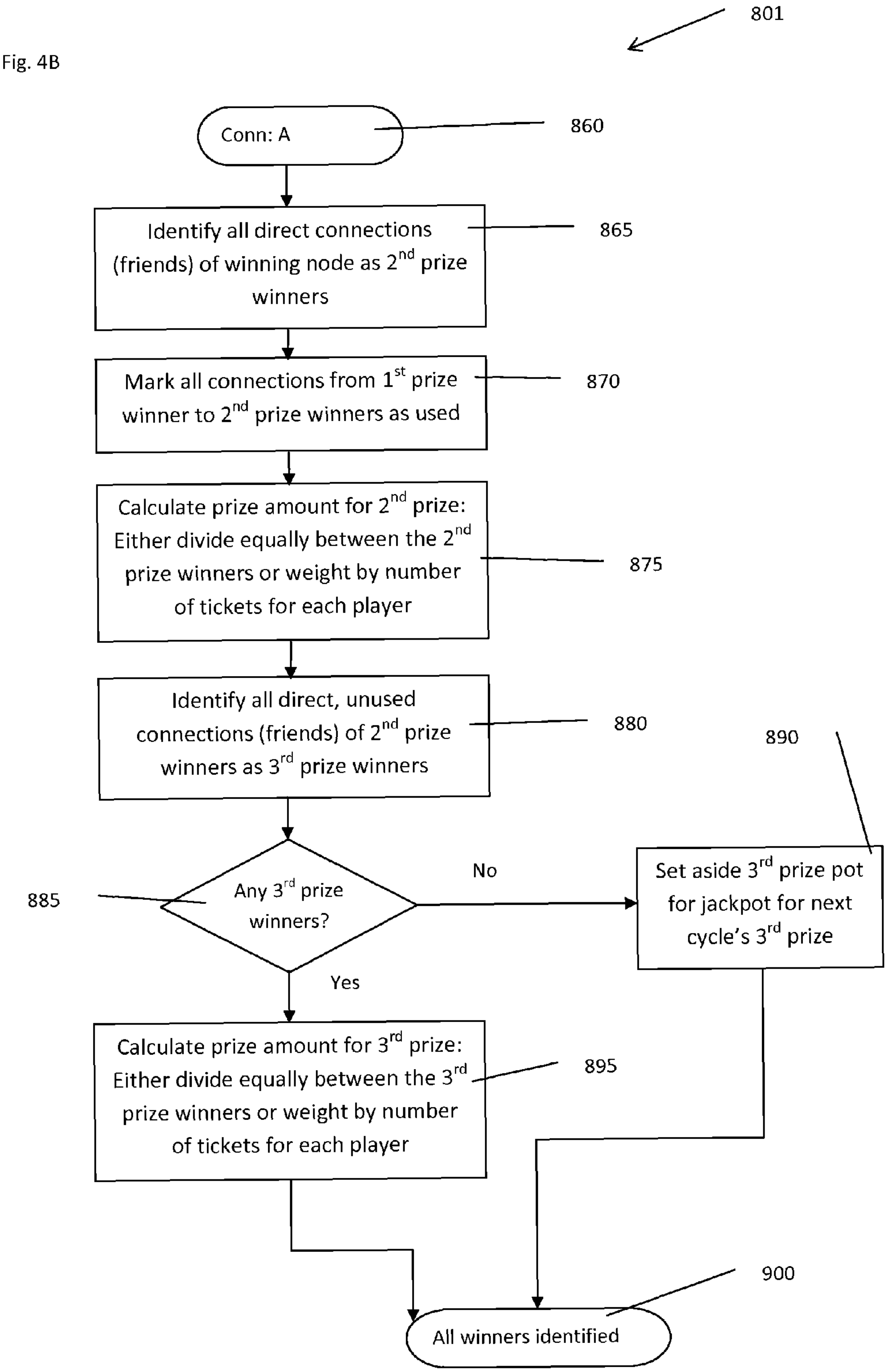
FIG. 4B: is the second part of a graphical representation of the method of the present invention to select all the winning tickets and identify the winners.
Figure 5:
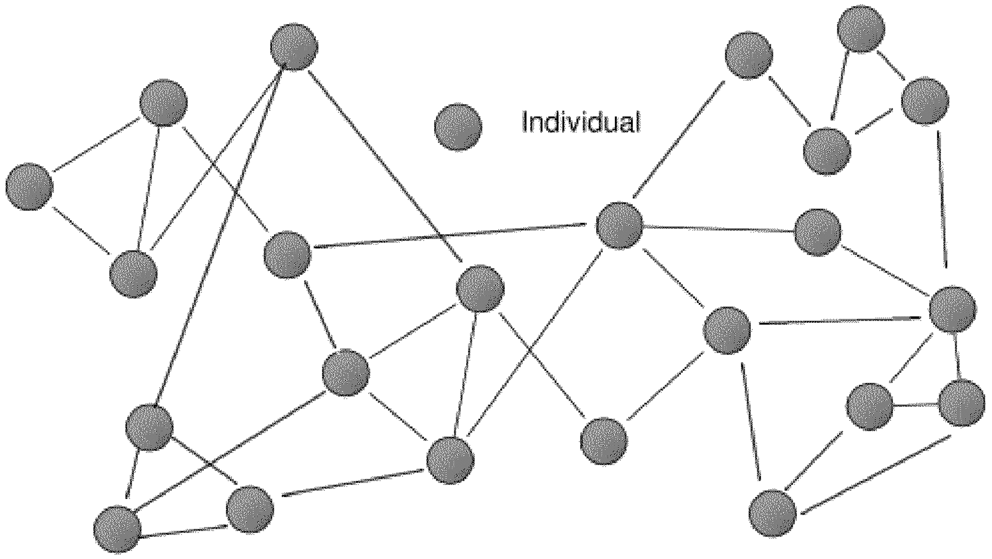
FIG. 5: is a graphical representation of a social network. Note the individual (unconnected) node on top.

FIGS. 4*a* and 4*b* show the third phase of the game cycle 630, which is selecting the winning tickets, identifying the winners, and calculating the prize amounts. Starting with FIG. 4*a*, a flowchart 800 describes the first part of this process. This process is initiated when the game cycle is closed 810. This is the point in time at which players can no longer purchase tickets, register tickets in the game database or make modifications to the social network that affect the current game cycle.

The first step is to generate 815 a representation of the active social network for the current game cycle. Note that in this preferred embodiment this step is simply to take the social network representation that was last modified in step 750 in the previous figure. In an alternative implementation the step 750 could be omitted, and the entire process step carried out in 815 with the same end result. It is anticipated that it is beneficial to perform this step early as described in step 750 since it helps to provide a snapshot of the status of the current game to the users.

The next step is to select the tickets that will win the $1^{st}$ prize. The status is initialized 820 so there are no current $1^{st}$ prize winners. Next, there is a random draw process to generate the first ticket that wins the $1^{st}$ prize 825. This could be a manual step outside of the central computer where the result is provided as input or it can be a random number function within the computer. In the preferred embodiment all tickets sold are indexed with the number between 1 and the number of sold tickets, N. A random number generator is set to output a random number between 1 and N. After the number is generated the number of $1^{st}$ prize tickets is incremented 830 by 1.

Next the central computer will search the game database for the winning number that was just drawn. If successful it will identify the node 835 in the social network representing the ticket holder. If this player has 'Unconnected player' status, as described in 770 in the previous flowchart, the process will step back to process step 825 above. The same will happen if no entry of the winning ticket was found in the game database. In either case, what this means is that the winning ticket belongs to a player, who is not connected within the social network of the current game. Since the $2^{nd}$ and $3^{rd}$ level prizes go to connections of the $1^{st}$ prize winners, this means that there would be no winners of $2^{nd}$ and $3^{rd}$ prize. In the preferred embodiment this scenario will lead to another draw from $1^{st}$ prize ticket. The first drawn ticket is still a winner, but the player will have to share the prize with subsequent winners. This process is repeated until the test in step 840 comes out with a positive confirmation that the winning ticket belongs to someone that has direct connections in the social network of the current game.

In other embodiments, for example in a six-number lottery game, in the equivalent of step 825, the winning numbers are generated in the traditional way, which can be drawing balls from a basket. In step 835 then, the central processor searches the database for registered tickets that won the first prize (or $2^{nd}$ prize in yet another embodiment) for the six-number lottery game. For this embodiment the step 840 would likely not be needed.

Back to the preferred embodiment, since a $1^{st}$ prize winning ticket with links to other players in the social network has now been identified, the drawing for $1^{st}$ prize winning tickets is complete. Now the prize payout for each $1^{st}$ prize ticket is calculated by dividing an pre-allocated portion of the pot for the $1^{st}$ prize by the number of $1^{st}$ prize winning tickets 845.

The process continues on FIG. 4*b* in flowchart 801. Next, the $2^{nd}$ prize winning tickets will be selected. The $2^{nd}$ prize goes to all tickets held by users that are directly connected in the social network to the connected player that registered a $1^{st}$ prize winning ticket 865. In other words, friends of the player who won the $1^{st}$ prize will win the $2^{nd}$ prize. Each user that owned one of the winning $2^{nd}$ prize tickets is now identified as a $2^{nd}$ prize winner 865.

All the connections, or links, between the first prize winner and the $2^{nd}$ prize winners are now labeled as 'Used' 870, which will impact the further selection of winning tickets.

In the preferred embodiment each ticket held by a $2^{nd}$ prize winner will win the $2^{nd}$ prize. In an alternative embodiment, each $2^{nd}$ prize winner will win only one second prize irrespective of the number of tickets that he has registered. The $2^{nd}$ prize payout is calculated in the preferred embodiment as the amount allocated for $2^{nd}$ prize divided by the number of winning $2^{nd}$ prize tickets 875. In the alternative embodiment the prize is divided evenly between the number of $2^{nd}$ prize winners, which means that each $2^{nd}$ prize winner receives the same total. The former is the preferred embodiment since it honors the principle that the second ticket purchased by a player is equally valuable as the first ticket. This does not hold true for the alternative embodiment, which means there would be some incentive to only buy one ticket.

Next the $3^{rd}$ prize winners are identified by selecting all direct and not 'Used' connections to each $2^{nd}$ prize winner 880. Here the 'Used' label refers to step 870 above. This means that the $1^{st}$ prize winner does not automatically win $3^{rd}$ prize because the same links that awarded $2^{nd}$ prize winners their win would be traced directly back to them for the $3^{rd}$ prize winning ticket selection. If the step 880 resulted in any $3^{rd}$ prize winners, then the same processing steps that was used for $2^{nd}$ prize winners is followed: The prize payout per ticket or per person is calculated in step 895. If no $3^{rd}$ prize winners are identified based on step 880, then the $3^{rd}$ prize pot is rolled over to the next game as the $3^{rd}$ prize jackpot. At this point all the winners and winning tickets have been identified 900.

Other embodiments may continue on to the $4^{th}$ prize and higher following the same process as described above. Yet other embodiments may continue to draw $1^{st}$ prize tickets until a winner is found, which would generate not only $2^{nd}$ prize winners but also $3^{rd}$ prize winners. These game design options would depend highly on the social network among within the player community. For highly connected networks the preferred embodiment should work well, but for less connected networks, it may yield too few winners, and thus have two long odds.

There are multiple challenges when constructing a lotto game. For one it must not be possible for big players to manipulate the game outcome in such a way that they can improve their own odds at the expense of the other players. The present invention safeguards against this by ensuring that each ticket has the same odds of winning the top prize, which is by random draw. However, a player with many connections that purchases many tickets each would have increased the odds of winning $2^{nd}$ prize, albeit with smaller expected prize amounts per ticket.

One unique and useful feature of the present invention is that it incorporates a social network into a traditional lottery type game, using proximity to higher-level prize winners in the social network to determine lower-level prize winning tickets. This introduces an entire new game dynamic, while preserving the random element and pari-mutuel nature of lottery games Another novel feature of the present invention is that it offers a natural means for recruiting new users by naturally encouraging players to invite their friends and family to join the game.

A first advantage of the present invention is that by incorporating a social network it adds an intriguing and engaging element to the players. Being able to trace the chain of winners from oneself to the first prize through the social network will highlight the social network itself and create a "Kevin-Bacon" small-world effect. This increased interest could be manifested as increased participation; thus the sponsors, the players and the recipients of lotto revenues all benefit.

A second advantage of the present invention is that it offers a means for recruiting new users by naturally encouraging players to invite their friends and family to join the game. It even encourages groups of players to buy more tickets to boost the chances of group winnings.

A third advantage of the present invention is that it creates good 'big win' stories, where many members of a community of friends and family will all win in the same game.

A fourth advantage of the present invention is that existing lotto gaming systems can be upgraded with the added social network winning ticket selection function. By doing this an existing lotto game provider could widen the player population increasing the benefits to all parties involved.

What is claimed is:

1. A method for selecting the winning tickets in a lottery game, comprising:

a plurality of tickets by a plurality of players at a plurality of locations, said method further comprising;

said lottery game having an ordered number of prize levels wherein a higher prize level is expected to yield a higher payout than a lower prize level;

wherein each said prize level either has an allocated portion of the pot to be distributed between the winning tickets at said prize level or a fixed prize amount per winning ticket;

presenting said plurality of players with a tool to make connections to other players wherein said connections and players will form a social network;

registering said tickets to be associated with said players in said social network;

operating upon said received plurality of said tickets and said social network within said central processor to determine the winning tickets, said determination comprising:

selecting winning tickets for at least one prize level based on the criterion that a winning ticket at said prize level must be registered to a player that has a direct connection in said social network to a player with a registered ticket that won a higher prize level.

2. The method of claim 1 where the $1^{st}$ prize winning ticket is selected in a random draw.

3. The method of claim 1 where a ticket registered to a player with a direct connection to a $1^{st}$ prize winner in said social network will win the $2^{nd}$ prize.

4. The method of claim 1 where a ticket registered to a player with a direct connection to a $2^{nd}$ prize level winner in said social network will win the $3^{rd}$ prize.

5. The method of claim 1 where the lottery game issues only unique tickets within a game cycle (raffle).

6. The method of claim 1 where said higher prize level is one of the prize level in a lotto game for picking a plurality of correct numbers from a plurality of possible numbers.

7. The method of claim 1 where a representation of the said social network is stored separately for each game cycle and is limited to players that participate in the current game cycle only.

8. The method of claim 2 wherein additional winning tickets are drawn until a winning ticket satisfies the following conditions:

the winning ticket is registered to a player in said social network;

said player having at least one direct connection in said social network;

said direct connection having at least one registered ticket in the current game cycle.

9. The method of claim 8 where the drawing of $1^{st}$ prize tickets is repeated until the additional condition is satisfied:

said direct connection having at least one direct connection other than the $1^{st}$ prize winner with at least one registered ticket.

10. The method of claim 3 wherein if there are no $2^{nd}$ prize winners the prize allocations $2^{nd}$ prize and any depending prize levels are rolled over into jackpots for the next game cycle.

11. The method of claim 4 where if there are no $3^{rd}$ prize winning tickets the prize allocations for $3^{rd}$ prize will be rolled over into a jackpot for the next game cycle.

12. The operating step of claim 1 wherein the link between two players that results in a new winning ticket is marked as 'Used' and thereafter cannot be used to generate a subsequent lower-level prize winner.

13. The tool step of claim 1 for generating a social network wherein a third party social network is used to establish said social network.

14. The tool step of claim 1 for generating a social network wherein a persistent social network is generated to be re-used from one game cycle to a later game cycle.

15. The step of claim 13 where the tool checks the third party network for changes in every game cycle.

16. The registering step of claim 1 wherein a notification of the new ticket is sent to the player's connection in the social network.

17. The method of claim 1 wherein the allocated prize amount for said prize level is distributed evenly between the winners of said prize level.

18. The method of claim 1 wherein the allocated prize amount for said prize level is distributed evenly between the winning tickets of said prize level.

19. The method of claim 1 wherein the tickets are sold at a local game terminal;

a separate interface is offered via either internet browser or an application wherein the registration of the ticket to the user is performed and the managing of the social network is performed.

20. The method of claim 1 wherein the tickets can be purchased by the users directly via an internet browser or a dedicated application.

21. The method of claim 1 wherein the winning tickets are communicated to the game terminals as in traditional lotteries.

22. The method of claim 1 wherein the winners who have registered their winning tickets in the registering step of claim 1 will be notified about the win via contact information in the user account.

23. An apparatus for selecting the winning tickets in a lottery game comprising:

one or more transaction units at remote locations, each of said transaction units allowing players to purchase a ticket;

a tool to manage a social network and register a purchased ticket to a user account;

a central processor, said central processor operating upon the sold ticket numbers received from said plurality of transaction units and said social network for the players that are registered with the tickets in a way that determines the winning tickets by selecting from at least one of a plurality of prize levels the winning tickets to be the ones that are registered to players that are directly linked in the social network to a player that had a registered ticket that won a higher prize level;

a network formed by each of said transaction units, an interconnection medium and said central processor such that each of said transaction units can communicate with said central processor upon request.

24. The apparatus of claim 23 wherein some of the transaction units are point-of-sale terminal.

25. The apparatus of claim 23 wherein some of the transaction units are personal computers or mobile phones.

* * * * *